United States Patent [19]
Tomisawa

[11] Patent Number: 5,611,311
[45] Date of Patent: Mar. 18, 1997

[54] CRANK ANGLE SENSING SYSTEM

[75] Inventor: Naoki Tomisawa, Atsugi, Japan

[73] Assignee: Unisia Jecs Corporation, Atsugi, Japan

[21] Appl. No.: 500,358

[22] Filed: Jul. 10, 1995

[30]     Foreign Application Priority Data

Jul. 11, 1994  [JP]  Japan .................................. 6-158509

[51] Int. Cl.⁶ .................................. F02P 5/15; F02P 7/06
[52] U.S. Cl. .......................... 123/414; 73/117.3; 123/494
[58] Field of Search ..................................... 123/414, 479,
123/494; 73/115, 116, 117.3

[56]                   References Cited

U.S. PATENT DOCUMENTS

| | | | |
|---|---|---|---|
| 4,744,243 | 5/1988 | Tanaka | 73/117.3 X |
| 5,284,114 | 2/1994 | Fukui | 123/414 |

FOREIGN PATENT DOCUMENTS

| | | |
|---|---|---|
| 62-146941 | 9/1987 | Japan . |
| 4-81557 | 3/1992 | Japan . |

*Primary Examiner*—Tony M. Argenbright
*Attorney, Agent, or Firm*—Foley & Lardner

[57]                      ABSTRACT

In order to improve the accuracy in detection of a crank angle position of an internal combustion engine, the crank angle position obtained from signals from a crank angle sensor is corrected by using a cylinder pressure inside an engine cylinder sensed by a cylinder pressure sensor. While the engine is in a predetermined non-firing condition, a control unit determines a crank angular distance (A at steps S1~S12) from a reference crank angle position at which the crank angle sensor produces a reference angle signal (REF), to a top dead center indicative position at which the sensed cylinder pressure becomes maximum. The control unit calculates a deviation (ΔREF) of the determined crank angular distance (A) from a predetermined reference angular distance (70°, for example), corresponding to a deviation of the mounting position of the crank angle sensor. Then, the control unit determines a corrected crank angle position (CAA) by using the thus-obtained angular deviation (ΔREF).

14 Claims, 5 Drawing Sheets

CRANK ANGLE SENSING SYSTEM

BACKGROUND OF THE INVENTION

The present invention relates to a system for sensing a crank angle of an internal combustion engine, and a control system for controlling a timing of the engine such as ignition timing and/or fuel injection timing.

A crank angle sensor is conventionally used in an electronic control system for an internal combustion engine, to determine an ignition timing (an angle of advance for ignition) and/or a fuel injection timing (a timing of start or end of fuel injection). The crank angle sensor produces a reference angle signal each time a reference crank angle position of each cylinder (BTDC 70°, for example) is reached. Furthermore, the crank angle sensor produces a unit angle signal in each angular displacement of a unit crank angle (1°, for example). The instantaneous crank angle position of each cylinder can be determined from the crank angle position at which the reference signal is generated, and the number of occurrences of the unit angle signals after the generation of the reference angle signal.

Because the reference angle position is thus used as a standard for measurement of the crank angle, the mounting position of the crank angle sensor must be adjusted accurately in the engine assembly process. The adjustment is normally done by monitoring the ignition position, and accordingly the adjustment is troublesome and time consuming.

SUMMARY OF THE INVENTION

It is therefore an object of the present invention to provide crank angle sensing system and process which can correct a deviation in the position of a crank angle sensing means, and thereby eliminate (or reduce) the necessity for adjustment of the position of the crank angle sensing means.

It is another object of the present invention to provide engine control system and process for controlling a timing of operation of the engine such as an ignition timing or a fuel injection timing, by using the thus-corrected crank angle position.

As shown by solid lines in FIG. 1, a crank angle sensing system according to the present invention comprises:

a crank angle sensing means 101 (14) for sensing a position of a moving member such as a crankshaft or a camshaft of the engine, and producing a reference angle signal (REF) at every predetermined reference crank angle position of each cylinder of the engine, and a unit angle signal (POS) at intervals of a unit crank angle to enable determination of a crank angle position of each cylinder of the engine from the reference crank angle position at which the reference signal is generated, and the number of occurrences of said unit angle signals after generation of the reference signal;

a cylinder pressure sensing means 102 (17) for sensing a cylinder pressure inside at least one cylinder of the engine, and producing a cylinder pressure signal representing the sensed cylinder pressure (P);

a top dead center detecting means 103 for receiving said reference angle signal (REF) and said unit angle signal (POS) from said crank angle sensing means 101 and said cylinder pressure signal from said cylinder pressure sensing means 102, determining a crank angle position at peak pressure which is a crank angle position at which the cylinder pressure becomes maximum under a predetermined non-combustion condition, and regarding said crank angle position at peak pressure as an angle at the top dead center; and a crank angle position correcting means 104 for comparing a crank angle phase difference between the top dead center determined by said top dead center detecting means 103 and the reference crank angle position sensed by the crank angle sensing means 101, with a predetermined standard value, and correcting the crank angle position sensed by the crank angle sensing means by using a deviation of the crank angle phase difference from the standard value.

As shown by broken lines in FIG. 1, the crank angle sensing system may be in the form of a control system further comprising an ignition timing control means 105 for controlling an ignition timing of the engine in accordance with the corrected crank angle position.

As shown by one dot chain lines in FIG. 1, the crank angle sensing system may be in the form of a control system further comprising a fuel injection timing control means 106 for controlling a fuel injection timing of the engine in accordance with the corrected crank angle position.

The cylinder pressure reaches a maximum at the top dead center when the engine is in a non-firing condition. Therefore, the phase difference between the position at which the reference signal is generated and the detected top dead center is indicative of the mounting position of the crank angle sensing means 101, and the deviation of the phase difference from a predetermined standard value is indicative of the deviation of the mounting position of the crank angle sensing means 101 from a predetermined standard position.

Therefore, the crank angle correcting means 104 can determine the correct crank angle position by correcting the crank angle position sensed by the crank angle sensing means 101 by using the deviation of the phase difference.

DETAILED DESCRIPTION OF THE INVENTION

Figure 1:
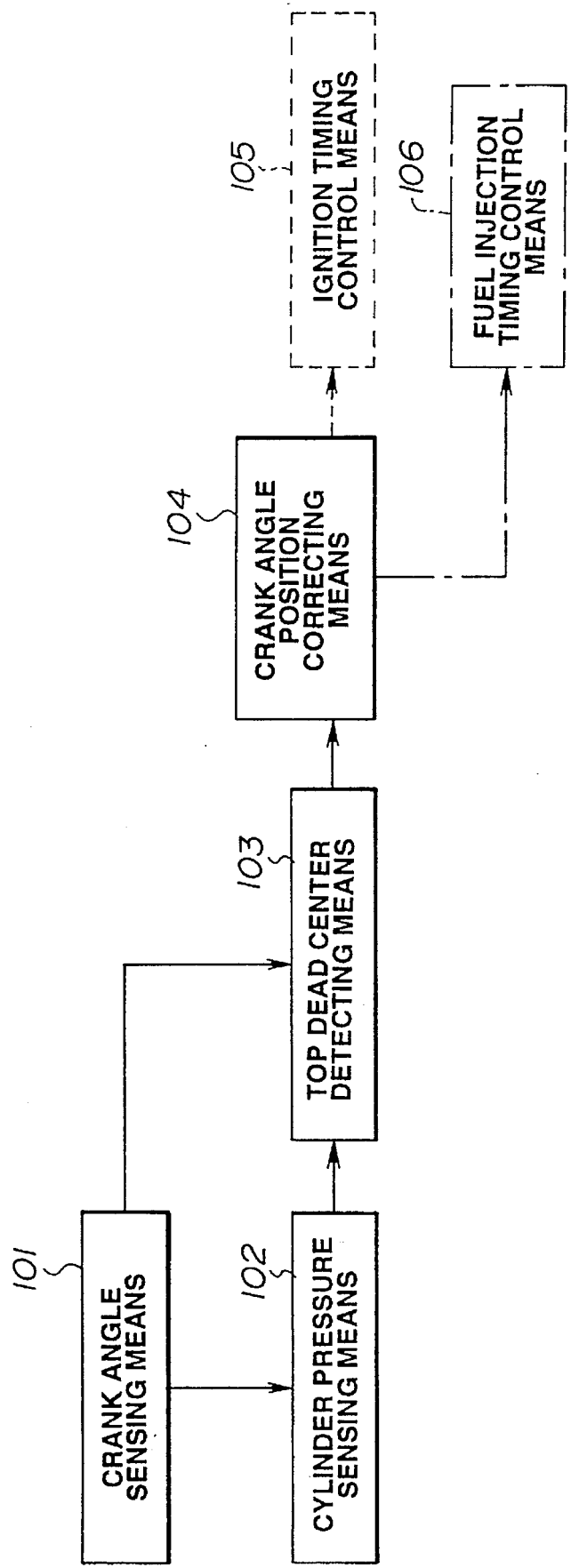
FIG. 1 is a block diagram showing a basic arrangement according to the present invention.
Figure 2:
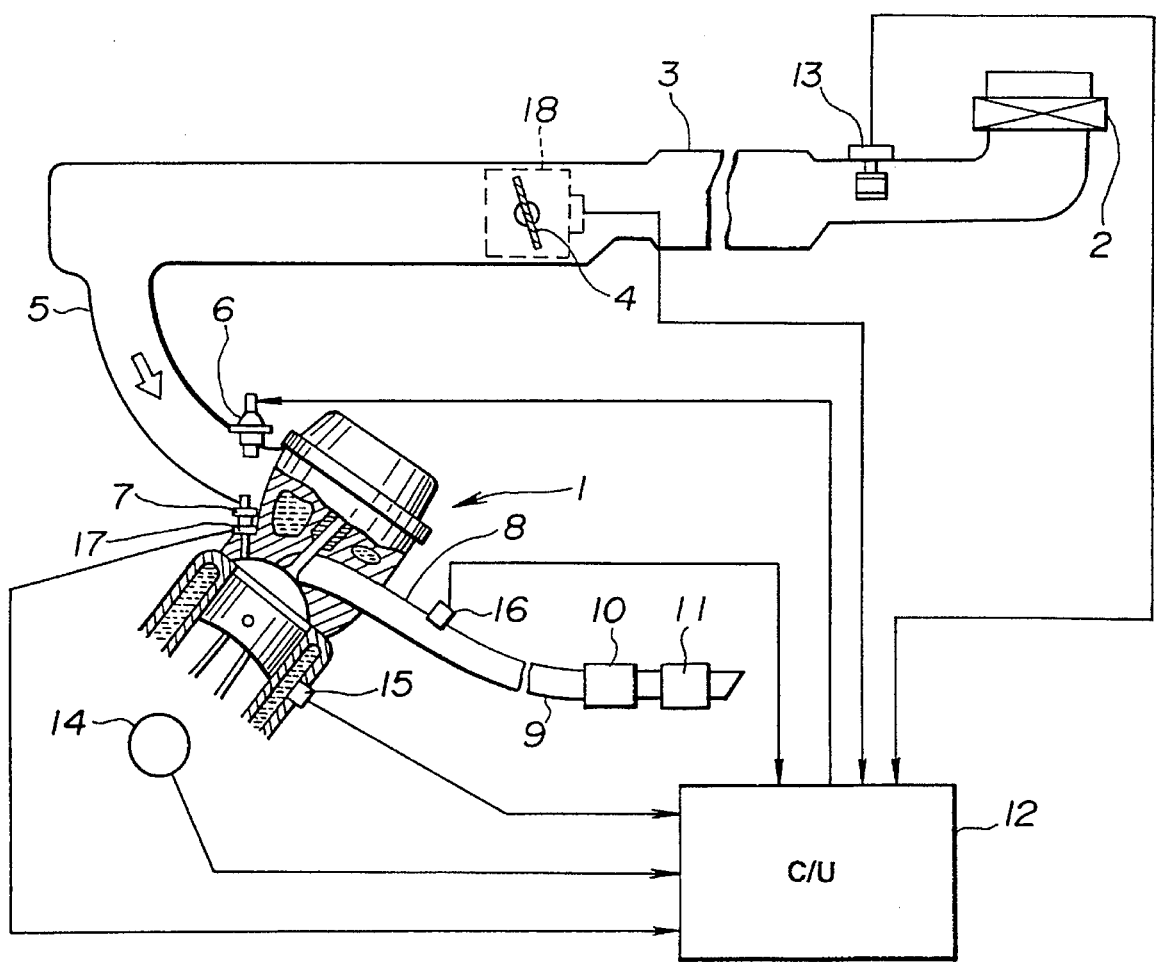
FIG. 2 is a schematic view showing an engine control system according to one embodiment of the present invention.

An engine system according to one embodiment of the present invention is shown in FIG. 2. The engine system has an internal combustion engine 1 such as an engine of a motor vehicle.

In the engine system shown in FIG. 2, air is drawn into the internal combustion engine 1 through an air cleaner 2, an intake duct 3, a throttle valve 4, and an intake manifold 5.

In branches of the intake manifold 5, there are provided fuel injection valves 6 for individual cylinders of the engine 1. In this example, each cylinder has a unique one of the fuel injection valves 6. The fuel injection valves 6 of this example are electromagnetic type injectors. Each injector 6 is opened when its solenoid is energized, and closed when the solenoid is deenergized. Each injector 6 is electrically connected with a control unit 12. The control unit 12 controls each injector 6 by sending a drive pulse signal. A fuel pump (not shown) delivers fuel under pressure, and a pressure regulator regulates the pressure of fuel at a predetermined level. The injector 6 receives the fuel at the thus-regulated pressure, and supplies the fuel by injection to the engine intermittently under the control of the control unit 12.

In each combustion chamber of the engine 1, there is provided an ignition plug 7 for producing a spark to ignite a fuel-air mixture in the cylinder. In this example, the ignition plugs 7, an ignition coil (not shown), and a circuit including at least one power transistor form an igniting means.

Exhaust gases from the engine 1 are conveyed through an exhaust manifold 8, an exhaust duct 9, a three-way catalytic converter 10 and a muffler 11, to the outside.

The control unit 12 is designed to electronically control the fuel injection quantity of the fuel injection valves 6 and the ignition timing of the ignition plugs 7. The control unit 12 of this example has a microcomputer (such as an onboard microcomputer) which, in this example, comprises a CPU, at least one ROM, at least one RAM, at least one A/D converter, and an input and output interface section (or input and output interface sections). The control unit 12 receives input signals from various sensors and controls the injectors 6 and the ignition plugs 7 by performing a predetermined control procedure.

The sensor group of this example is as follows.

An air flow sensor (or air flow meter) 13 is provided in the intake duct 3, and arranged to produce a signal representing an intake air flow quantity Q to the engine 1.

A crank angle sensor 14 of this example is provided at a cam shaft (not shown) of the engine 1, and arranged to sense the crank angle through revolution of the cam shaft. The crank angle sensor 14 produces a reference angle signal REF for signaling every reference angular position, and a unit angle signal POS for signaling every unit angle of crankshaft revolution. In this example, the engine 1 is a four cylinder engine, and the crank angle sensor 14 produces the reference signal REF at every reference angle (BTDC 70°, for example) of each cylinder and the unit angle signal POS every unit angle (1°, for example). The crank angle sensor 14 can serve as the crank angle sensing means 101.

The reference signal REF is designed to make it possible to discriminate each individual cylinder. For example, a sensor signal corresponding to at least one specified cylinder is distinguishable from the other sensor signals in terms of a pulse width (or pulse duration) or some other signal characteristic.

A coolant temperature sensor 15 senses the temperature Tw of a cooling water in a water jacket of the engine 1.

An oxygen sensor 16 is disposed in a meeting portion of the exhaust manifold 8. The oxygen sensor 16 senses the air fuel ratio of the air fuel mixture flowing into the engine 1 by sensing the percentage of oxygen in the exhaust gas mixture.

A cylinder pressure sensor 17 is provided for each ignition plug 7 in this example. The cylinder pressure sensors 17 can serve as the cylinder pressure sensing means 102 which, in this example, senses the pressure inside each cylinder. In this example, each pressure sensor 17 is in the form of a washer, and mounted on a corresponding one of the ignition plugs 7 as disclosed in Japanese Utility Model Provisional (Unexamined) Publication No. 62-146941. The pressure sensors 17 of this type are designed to sense the cylinder pressure P as a relative pressure with a piezoelectric element.

In the present invention, the means 102 for sensing the pressure in an engine cylinder is not limited to the above-mentioned washer type sensor. It is possible, for example, to employ a pressure sensor of a type having a sensing section directly exposed in a combustion chamber, as disclosed in Japanese Patent Provisional (Unexamined) Publication 4-81557.

A throttle sensor 18 is arranged to sense a throttle opening degree TVO of the throttle valve 4.

Figure 3:
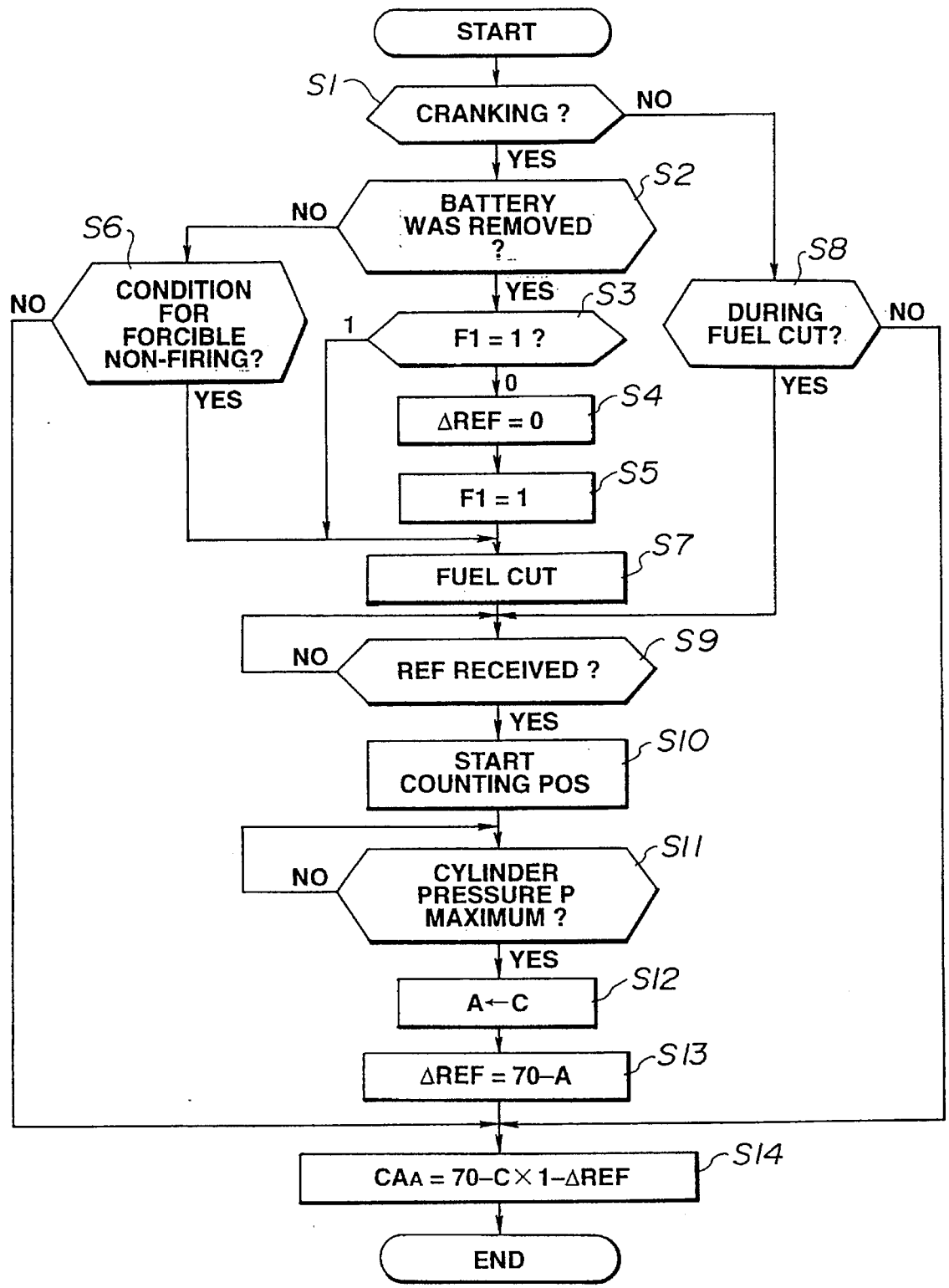
FIG. 3 is a flow chart showing a crank angle position correcting routine according to the embodiment.

The control unit 12 receives the signals from these sensors, and performs a crank angle position correcting procedure as shown in a flow chart of FIG. 3.

Figure 4:
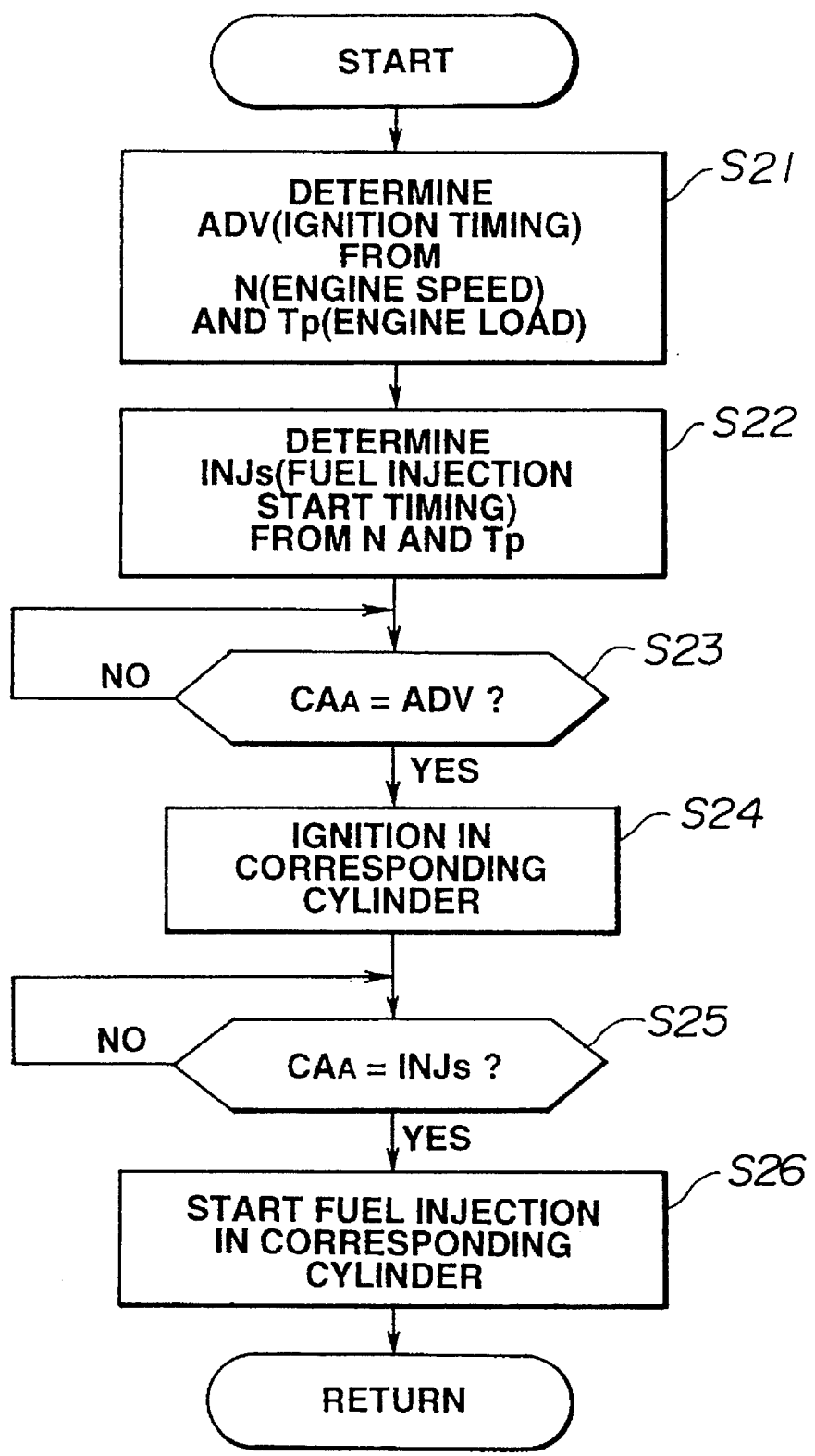
FIG. 4 is a flow chart showing an engine control routine for ignition timing control and fuel injection timing control according to the embodiment of the invention.

In this example, the control unit 12 can function as the top dead center detecting means 103, the crank angle position correcting means 104, and the timing control means 105 and 106 by means of a software system as shown in FIGS. 3 and 4.

At a step S1 in FIG. 3, the control unit 12 (the CPU of the control unit 12, that is) determines whether the engine 1 is in a cranking operation or not. If the cranking operation is under way, the control unit 12 proceeds to a step S2, and checks at the step S2 whether a battery was removed after the last cranking operation.

If the judgment is that the battery was removed, then the control unit 12 proceeds to a step S3, and determines at the step S3 whether a flag F1 is set to one or not.

If the flag F1 is equal to zero, that is, if this cranking operation is a first cranking operation after the previous removal of the battery, and this is a first execution of the step S3, then the control unit 12 proceeds to a step S4 and resets a deviation ΔREF of a crank angular position equal to zero at the step S4. After the step S4, the control unit 12 sets the flag F1 to one, and then proceeds to a step S7. Therefore, in a next execution, the judgment at the step S3 is F1=1, and the control unit 12 proceeds from the step S3 directly to the step S7. At the step S7, the control unit 12 forcibly cuts off the fuel supply for a predetermined number of cycles. After the step S7, the control unit 12 proceeds to a step S9.

When it is judged at the step S2 that the battery was not removed in the previous time, the control unit 12 proceeds from the step S2 to a step S6, and determines at the step S6 whether a predetermined condition for forcible fuel cut to create a non-combustion condition for crank angle position correction exists. If the predetermined condition for the forcible fuel cut exists, then the control unit 12 proceeds from the step S6 to the step S7, and performs the forcible fuel cut at the step S7 for a predetermined number of cycles. If the predetermined condition for the forcible fuel cut does not exist, then the control unit 12 proceeds directly from the step S6 to a step S14, and determines the corrected crank angle position based on the stored value of the deviation ΔREF without updating the previous result of the crank angle position correction.

When the engine 1 is not in the cranking operation and accordingly the answer of the step S1 is negative, then the control unit 12 proceeds from the step S1 to a step S8, and determines, at the step S8, whether a fuel cut control during a normal engine operation is being performed or not. From the step S8, the control unit 12 proceeds to the step S9 if the fuel cut control is in process, and to the step S14 if the fuel cut control is out of operation.

At the step S9 subsequent to the step S7 or S8, the control unit 12 waits for a next generation of the reference signal REF. Upon receipt of the most recent reference signal REF, the control unit 12 starts counting occurrences of the unit angle signals POS at a next step S10.

Then, at a step S11, the control unit 12 reads in the cylinder pressure P sensed by the cylinder pressure sensor 10 of the cylinder corresponding to the above-mentioned reference signal REF, determines a crank angle position when the cylinder pressure P becomes maximum, and regards the thus-determined crank angle position as a top dead center. One of the easiest methods to detect the top dead center is to find a point at which a variation ΔP of the cylinder pressure P changes from positive to negative.

At a step S12 following the step S11, the control unit 12 determines a crank angle phase difference A from the position of the reference signal REF to the top dead center by the count C of the unit angle signals POS.

At a next step S13, the control unit 12 computes the deviation ΔREF (=70–A, for example) between the crank angle phase difference A and the before-top-dead-center crank angle (70°, for example) of the predetermined reference crank angle position, and stores the computed deviation. This deviation ΔREF is indicative of a deviation of the actual mounting position of the crank angle sensor 11 from the predetermined correct position. The deviation ΔREF is positive when the mounting position of the crank angle sensor 11 is deviated in a direction in which the actual reference crank angle position is smaller than the predetermined reference advance angle (70°, for example), and the deviation ΔREF is negative when the mounting position of the crank angle sensor 11 is deviated in a direction in which the actual reference crank angle position is greater than the predetermined reference advance angle (70°, for example). After the step S13, the control unit 12 proceeds to the step S14.

At the step S14, the control unit 12 determines a corrected crank angle position in the form of a corrected angle CAA before the top dead center, according to the following equation.

$$CAA = R - C \times (unit\ angle) - \Delta REF$$

where R is the predetermined reference angle (70°) before TDC, corresponding to the reference crank angle position.

FIG. 4 is a flow chart showing an engine timing control routine which, in this example, is designed to control both the engine ignition timing and the fuel injection timing by using the corrected angle CAA corrected in accordance with ΔREF.

At a step S21, the control unit 12 determines a desired ignition timing ADV (in the form of an angle before TDC) in accordance with engine operating conditions such as an engine revolution speed N and an engine load (a basic fuel injection quantity Tp, for example).

At a step S22, the control unit 12 determines a desired fuel injection start timing INJs (in the form of an angle before TDC). The injection start timing INJs may be fixed at a constant crank angle position, or the injection start timing INJs may be controlled in accordance with the engine operating conditions. For example, the fuel injection start timing INJs can be determined in accordance with the engine speed N and the basic fuel injection quantity Tp (the injection pulse width) so that the fuel injection can end in a predetermined period during the intake stroke.

At a step S23, the control unit 12 determines whether the corrected crank angle position CAA of the cylinder to be fired next, determined by the routine of FIG. 3 reaches the desired ignition timing ADV. When the corrected crank angle position CAA becomes equal to ADV, the control unit 12 commands the ignition of the corresponding cylinder at a step S24.

At a step S25, the control unit 12 determines whether the corrected crank angle position CAA of the cylinder to be injected with fuel next, determined by the routine of FIG. 3 reaches the desired fuel injection start timing INJs. When the corrected crank angle position CAA becomes equal to INJs, the control unit 12 commands a start of the fuel injection to the corresponding cylinder at a step S26.

In this way, this engine control system can control the ignition timing and the fuel injection timing accurately by using the crank angle corrected by the cylinder pressure.

An amount of change of the cylinder pressure per unit crank angle is small near the top dead center. Therefore, the control system may be arranged to compare the cylinder pressure with a predetermined slice level, to store a first crank angle position at which the cylinder pressure becomes equal to the slice level during a piston ascending stroke and a second crank angle position at which the cylinder pressure becomes equal to the slice level during a piston descending stroke, and to determine an angle of the top dead center which is a middle value, or an average, of these first and second crank angle positions.

The thus-constructed control system according to the present invention can detect the top dead center by monitoring the cylinder pressure and correct the crank angle position accurately.

By sensing the cylinder pressure of each cylinder, and correcting the crank angle position of each cylinder, the control system can reduce or eliminate cylinder to cylinder variations and further improve the accuracy of the crank angle detection.

By employing a backup memory storing the deviation from the reference value even after the power supply is turned off, the control system can perform the correction of the crank angle position accurately from the beginning of a next operation.

The control system can perform the top dead center detection during a fuel cut operation during the normal operation other than the cranking operation. In this case, the control system need not produce a non-combustion state only for the purpose of the crank angle correction.

The control system can perform the top dead center detection during the cranking operation. In this case, there is no need for operating the engine in a special non-combustion condition, and the accurately corrected crank angle is available from the start of the engine.

The control system can be arranged to reset the deviation stored in the backup memory when the battery is removed, or when the battery is installed, then to perform a fuel cut operation for a predetermined crank angle interval after a start of a first cranking operation, and to perform the top dead center detection during this fuel cut operation. In this case, the control system can offer the corrected crank angle position from the start of the next operation even when the battery is removed.

The control system enables an accurate ignition timing control and/or an accurate fuel injection timing control.

Figure 5:
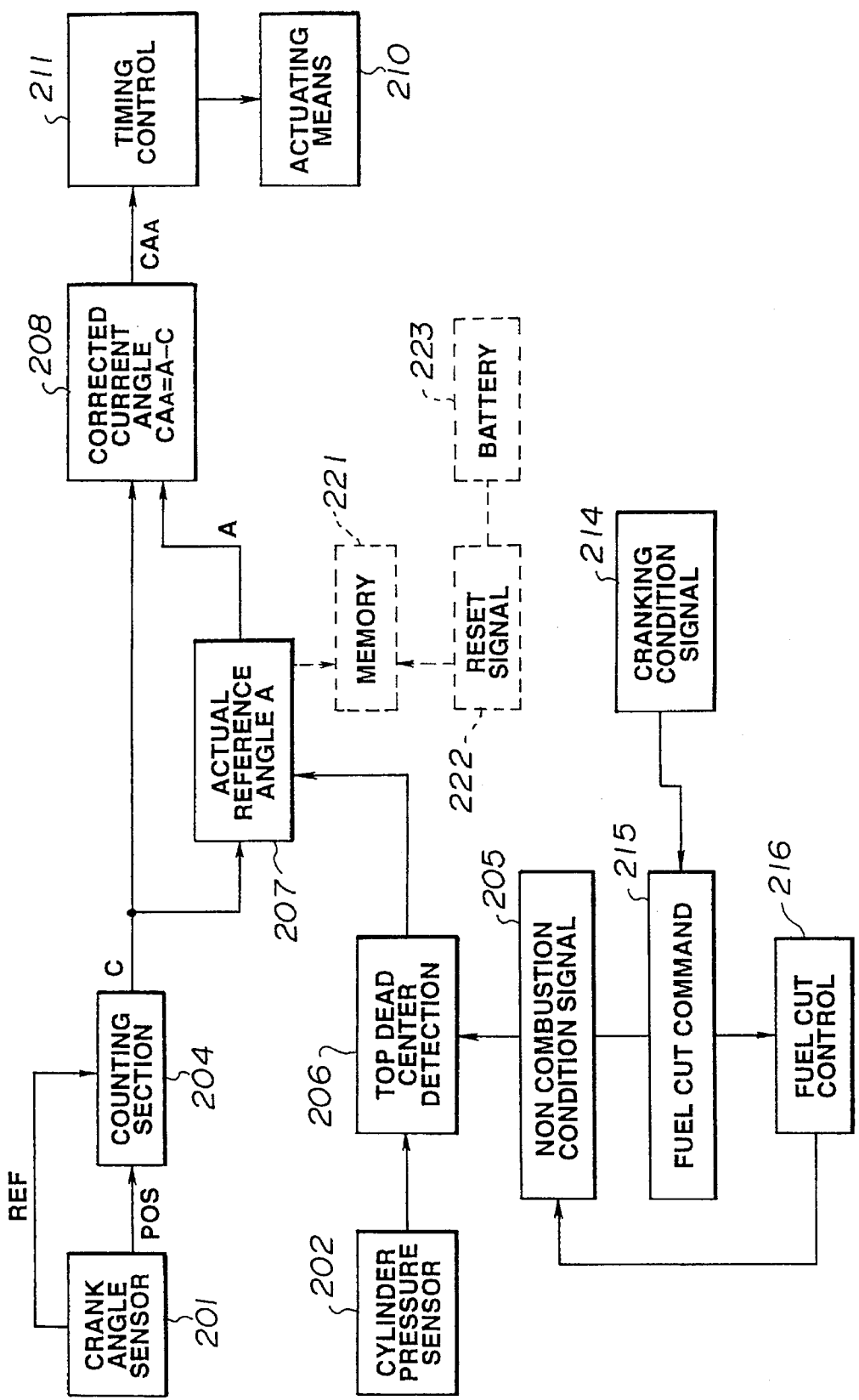
FIG. 5 is a block diagram showing one example of an engine control system according to the present invention.

According to the illustrated embodiment, as explained above, an engine control system comprises at least a sensor group (13, 14, 15, 16, 17, 18) for sensing at least one engine operating condition of the engine (1), and a control unit (12). The engine has at least one cylinder which is referred to as a first cylinder hereinafter. As shown in FIG. 5, the sensor group comprises at least a crank angle sensor 201 (14) producing a unit crank angle signal (POS) periodically at intervals of a unit angle (1°, for example) of revolution of a crankshaft of said engine, and a reference angle signal (REF) at a predetermined reference angle relative to a top dead center (for example, at 70° before the top dead center) in the first cylinder. The control unit in the example of FIG. 5 comprises a counting section or means 204 for counting the unit angle signals (POS) received after receipt of the reference angle signal (REF), and determining a sensed current angle relative to the top dead center (C×1° before the top dead center, for example) from the count C.

The sensor group shown in FIG. 5 further comprises at least one cylinder pressure sensor 202 (17) for sensing a cylinder pressure (P) in the first cylinder of the engine.

The control unit in the example of FIG. 5 further comprises:

a condition discriminating section or means 205 (S1, S6, S7, S8) for producing a non-combustion condition signal when the first cylinder of the engine is in a predetermined incombustible state in which a fuel supply to the first cylinder is cut off;

a top dead center detecting section or means 206 (S11) for producing a top dead center detection signal when the cylinder pressure becomes maximum while said non-combustion condition signal is present;

an actual reference angle determining section or means 207 (S12) for receiving a sensed current angle signal representing the sensed current angle (C×1°) which is equal to a product (C×1°) resulting from multiplication of the unit angle (1°, for example) by the count (C) reached by counting of the counting means 204 and the top dead center detection signal from the top dead center detecting means 206, and for determining an actual reference angle (A) which is the sensed current angle (C×1°) obtained at the instant that the top dead center detection signal is inputted to the actual reference angle determining section 207 from the top dead center detecting section 206; and a corrected current angle determining section or means 208 (S14) for determining the corrected instantaneous current angle (CAA) which is equal to a result of an algebraic addition (A–C, for example) of the actual reference angle (A) determined by said actual reference angle determining section 207 and a quantity (–C or +C, for example) whose absolute value is equal to the sensed current angle (C×1°) determined by the counting section 204.

The control system shown in FIG. 5 further comprises an actuating means 210 which may includes either or both of a fuel supplying system having at least one component such as the fuel injector 6, and an ignition system. The control unit further comprises a timing control section or means 211 for controlling a timing of an engine operation such as the ignition timing and the fuel supplying timing by using the corrected current angle (CAA) determined by the section 208.

The engine system in the example shown in FIG. 5 further comprises a cranking operation detecting means 214 for producing a cranking condition signal when said engine is in a cranking operation. The cranking operation detecting means 214 may comprise an ignition switch or a switch for turning on a starter motor for the engine. The control unit in the example of FIG. 5 further comprises a fuel cut control section or means 216 for sending a fuel cut control signal to the fuel supplying means included in the actuating means 210 to cut off a fuel supply at least to the first cylinder in accordance with the engine operating conditions, and a fuel cut commanding section or means 215 for commanding the fuel cut control section 216 to produce said fuel cut control signal to detect the top dead center when said cranking condition signal is present. The condition discriminating section 205 is arranged to produce the non-combustion condition signal when the fuel cut control signal is produced during the normal operation of the engine or at the command of the fuel cut commanding section 215 during the cranking operation.

The control unit in the example of FIG. 5 further comprises a backup memory 221 for storing the actual reference angle A directly or in the form of a deviation (ΔREF=R–A, for example) of the actual reference angle A from the predetermined reference angle R (70°, for example), and a resetting means 222 for monitoring a power supply 223 such as a battery (a battery mounted on a motor vehicle, for example) and resetting the actual reference angle A to the predetermined reference angle (R=70°, for example) or resetting the deviation (ΔREF) to zero when the power supply was once disconnected.

According to the illustrated embodiment, an engine control process for an internal combustion engine, comprises:

a crank angle sensing step (S10) for counting unit angle signals (POS) representing a unit angle (1°, for example) of crankshaft revolution of the engine from occurrence of a reference angle signal (REF) representing a predetermined reference angle (70° before the top dead center, for example) of the crankshaft revolution of the engine, and determining a sensed current crank angle (C×1°) in accordance with a count (C) of said unit angle signals (POS);

a condition discriminating step (S1, S6, S7, S8) for determining whether the engine is in a predetermined non-combustion state, and producing a non-combustion condition signal when a first cylinder of the engine is in the predetermined non-combustion state;

a top dead center detecting step (S11) for monitoring a cylinder pressure signal representing a sensed cylinder pressure in the first cylinder of the engine while the non-combustion condition signal is present, producing a top dead center detection signal (the signal representing the affirmative answer YES of the step S11) when said cylinder pressure reaches a condition of a maximum pressure; and a correcting step (S12, S13, S14) for determining an actual reference angle (A) relative to a top dead center from the count (C) of said unit angle signals reached when said top dead center detection signal is produced, and determining a corrected current angle (CAA=R–C×1–ΔREF=A–C, for example) relative to the top dead center in accordance with the actual reference angle (A) and the sensed current angle (C×1°).

The control process may further comprise a controlling step (S23–S26) of producing a timing control signal for controlling one of an ignition timing and a fuel injection timing of said engine when said corrected current angle (CAA) becomes equal to a predetermined desired angle (ADV, INJs).

The condition discriminating step may comprise a first sub-step (S1) of determining whether the engine is in a cranking operation, a second sub-step (S6, S7) of cutting off a fuel supply to the first cylinder of the engine for a predetermined period when said engine is in the cranking operation and producing said non-combustion condition signal, and a third sub-step (S8) of producing said non-combustion condition signal when said engine is in a normal fuel cut off operation.

What is claimed is:

1. A crank angle sensing system for an internal combustion engine, said sensing system comprising:

a crank angle sensing means for producing a reference angle signal at every predetermined reference crank angle position of each cylinder of the engine, and a unit angle signal at intervals of a unit crank angle, so that an actual crank angle position of each cylinder of the engine can be determined by counting a number of occurrences of said unit angle signals after occurrence of said reference signal;

a cylinder pressure sensing means for sensing a cylinder pressure inside at least one cylinder of the engine, and producing a cylinder pressure signal representing the cylinder pressure;

a top dead center detecting means for receiving said reference angle signal and said unit angle signal from said crank angle sensing means and said cylinder pressure signal from said cylinder pressure sensing means, and detecting a top dead center by finding a maximum pressure providing crank angle position which is a crank angle position at which the cylinder pressure becomes maximum in a non-combustion condition; and a crank angle position correcting means for comparing a crank angle phase difference between the top dead center determined by said top dead center detecting means and the reference crank angle position determined by said crank angle sensing means, with a predetermined standard value, and correcting the crank angle position sensed by the crank angle sensing means by using a deviation of the crank angle phase difference from the standard value, wherein said rod dead center detecting means includes a fuel-cut forcing means for putting said engine in said non-combustion condition to detect said top dead center by cutting off a fuel supply to the engine.

2. A crank angle sensing system as claimed in claim 1 wherein said cylinder pressure sensing means comprises a plurality of pressure sensors which are provided, respectively, in a plurality of cylinders of said engine, said top dead center detecting means includes a means for determining the top dead center of each cylinder in accordance with the cylinder pressure in a corresponding one of the cylinders, and said crank angle correcting means includes a means for correcting the crank angle position of each cylinder in accordance with the top dead center of a corresponding one of the cylinders and the reference angle position of the corresponding one of the cylinders.

3. A crank angle sensing system as claimed in claim 1 wherein said crank angle correcting means comprises a backup memory for storing said deviation even when a power supply is switched off.

4. A crank angle sensing system as claimed in claim 3 wherein said top dead center detecting means comprises a resetting means for resetting said deviation stored in said backup memory when the power supply in a form of a battery is removed, then performing a fuel cut operation for an interval of a predetermined crank angle in a first cranking operation after the removal of the battery, and detecting the top dead center during the fuel cut operation.

5. A crank angle sensing system as claimed in claim 1 further comprising an ignition timing control means for controlling an ignition timing of said engine in accordance with the crank angle position corrected by said crank angle correcting means.

6. A crank angle sensing system as claimed in claim 1 further comprising a fuel injection timing control means for controlling a fuel injection timing of said engine in accordance with the crank angle position corrected by said crank angle correcting means.

7. A crank angle sensing system for an internal combustion engine, said sensing system comprising:

a crank angle sensing means for producing a reference angle signal at every predetermined reference crank angle position of each cylinder of the engine, and a unit angle signal at intervals of a unit crank angle, so that an actual crank angle position of each cylinder of the engine can be determined by counting a number of occurrences of said unit angle signals after occurrence of said reference signal;

a cylinder pressure sensing means for sensing a cylinder pressure inside at least one cylinder of the engine, and producing a cylinder pressure signal representing the cylinder pressure;

a top dead center detecting means for receiving said reference angle signal and said unit angle signal from said crank angle sensing means and said cylinder pressure signal from said cylinder pressure sensing means, and detecting a top dead center by finding a maximum pressure providing crank angle position which is a crank angle position at which the cylinder pressure becomes maximum in a non-combustion condition; and a crank angle position correcting means for comparing a crank angle phase difference between the top dead center determined by said top dead center detecting means and the reference crank angle position determined by said crank angle sensing means, with a predetermined standard value, and correcting the crank angle position sensed by the crank angle sensing means by using a deviation of the crank angle phase difference from the standard value, wherein said top dead center detecting means includes a cranking condition discriminating means for allowing detection of said top dead center during a cranking operation of the engine.

8. A crank angle sensing system as claimed in claim 7 wherein said cylinder pressure sensing means includes a plurality of pressure sensors which are provided, respectively, in a plurality of cylinders of said engine, said top dead center detecting means includes a means for determining the top dead center of each cylinder in accordance with the cylinder pressure in a corresponding one of the cylinders, and said crank angle correcting means includes a means for correcting the crank angle position of each cylinder in accordance with the top dead center of a corresponding one of the cylinders and the reference angle position of the corresponding one of the cylinders.

9. A crank angle sensing system as claimed in claim 7 wherein said crank angle correcting means includes a backup memory for storing said deviation even when a power supply is switched off.

10. A crank angle sensing system as claimed in claim 7 further comprising an ignition timing control means for controlling an ignition timing of said engine in accordance with the crank angle position corrected by said crank angle correcting means.

11. A crank angle sensing system as claimed in claim 7 further comprising a fuel injection timing control means for controlling a fuel injection timing of said engine in accordance with the crank angle position corrected by said crank angle correcting means.

12. An engine system comprising:

an internal combustion engine;

a sensor group for sensing engine operating conditions of said engine, said sensor group comprising a crank angle sensor producing a unit crank angle signal periodically at intervals of a unit angle of revolution of a crankshaft of said engine, and a reference angle signal at a predetermined reference angle relative to a top dead center in a first cylinder that is a cylinder of said engine, and a cylinder pressure sensor for sensing a cylinder pressure inside said first cylinder of said engine;

a control unit for monitoring the cylinder pressure sensed by said cylinder pressure sensor while said engine is in a non-combustion operating state, producing a top dead center signal when the cylinder pressure reaches a condition of a maximum pressure in said non-combustion operating state, determining an actual reference angle relative to the top dead center by counting the unit angle signals received between the reference angle signal and the top dead center signal, and determining a corrected current angle relative to the top dead center in accordance with said actual reference angle and a sensed current angle determined by counting the unit angle signals counted after the reference angle signal;

an actuating means for preforming a predetermined action for said engine upon receipt of a timing control signal; and a cranking operation detecting means for producing a cranking condition signal when said engine is in a cranking operation;

wherein said control unit includes a timing control means for producing said timing control signal when said corrected current angle relative to the top dead center reaches a predetermined desired angle, a counting means for determining said sensed current angle by counting said unit angle signals after reception of said reference signal, a condition discriminating means for determining whether said engine is in said non-combustion state in which a fuel supply to said first cylinder is cut off, and for producing a non-combustion condition signal when said engine is in said non-combustion state, a top dead center detecting means for monitoring the cylinder pressure and producing said top dead center signal when the cylinder pressure reaches the condition of the maximum pressure while said non-combustion condition signal is present, an actual reference angle determining means for determining said actual reference angle which is equal to a product resulting from multiplication of said unit angle by a count reached by counting of said counting means when said actual reference angle determining means receives said top dead center signal from said top dead center detecting means, and a corrected angle determining means for determining said corrected current angle which is equal to a result of an algebraic addition of said actual reference angle determined by said actual reference angle determining means and a quantity whose absolute value is equal to said sensed current angle determined by said counting means;

wherein said actuating means includes a means for varying at least one of an ignition timing and a fuel injection timing of the engine;

wherein said predetermined reference angle relative to the top dead center is an angle before the top dead center;

wherein said corrected angle determining means of said control unit determines said corrected current angle relative to the top dead center by subtracting said sensed current angle from said actual reference angle;

wherein said actuating means includes a fuel supplying means for supplying fuel to said engine;

wherein said control unit further includes a fuel cut control means for causing said fuel supplying means to cut off a fuel supply to said first cylinder by producing a fuel cut control signal, and a fuel cut commanding means for commanding said fuel cut control means to produce said fuel cut control signal when said cranking condition signal is present; and wherein said condition discriminating means includes a means for producing said non-combustion condition signal when the fuel cut control signal is present.

13. An engine system as claimed in claim 12: wherein said control unit comprises a backup memory for storing said actual reference angle determined by said top dead center detecting means, and a resetting means for monitoring a power supply to said control unit and resetting said actual reference angle equal to said predetermined reference angle when said power supply is in a predetermined condition.

14. An engine control process for an internal combustion engine, said control process comprising:

a crank angle sensing step counting unit angle signals representing a unit crank angle of crankshaft revolution of the engine from occurrence of a reference angle signal representing a predetermined reference angle of the crankshaft revolution of the engine, and determining a sensed current crank angle in accordance with a count of said unit angle signals;

a condition discriminating step for determining whether the engine is in a predetermined non-combustion state, and producing a non-combustion condition signal when the engine is in the predetermined non-combustion state;

a top dead center detecting step for monitoring a cylinder pressure representing a sensed cylinder pressure in a first cylinder of the engine while said non-combustion condition signal is present, producing a top dead center signal when said cylinder pressure reaches a condition of a maximum pressure;

a correcting step for determining an actual reference angle relative to a top dead center from the count of said unit angle signals reached when said top dead center signal is produced, and determining a corrected current angle relative to the top dead center in accordance with said actual reference angle and said sensed current angle determined in said crank angle sensing step; and a controlling step of producing a timing control signal for controlling one of an ignition timing and a fuel injection timing of said engine when said corrected current angle becomes equal to a predetermined desired angle, wherein said corrected current angle relative to the top dead center is an angle before the top dead center and determined, in said correcting step, by subtracting the sensed current angle from said actual reference angle, wherein said condition discriminating step includes a first sub-step of determining whether the engine is in a cranking operation, a second sub-step of cutting off a fuel supply to said engine for a predetermined period when said engine is in the cranking operation and producing said non-combustion condition signal, and a third sub-step of producing said non-combustion condition signal when said engine is in a normal fuel cut off operation.

* * * * *